United States Patent [19]

Keenan et al.

[11] Patent Number: 5,378,096

[45] Date of Patent: Jan. 3, 1995

[54] COLLAPSIBLE AND EXPANDABLE VOID FILLER

[75] Inventors: Thomas C. Keenan, Brentwood, Tenn.; Philip B. Lo Presti, Chicago; Donald L. Van Erden, Wildwood, both of Ill.

[73] Assignee: Shippers Paper Products Company, Glenview, Ill.

[21] Appl. No.: 163,532

[22] Filed: Dec. 9, 1993

[51] Int. Cl.$^6$ .................. B61D 45/00; B63B 25/24; B65D 81/04

[52] U.S. Cl. ..................... 410/154; 206/593

[58] Field of Search .................. 410/121, 154, 155; 428/12; 108/51.3, 53.1; 206/593, 814, 561, 562; 229/904, 120.32, 120.15, 40; 52/381, 577, 731

[56] References Cited

U.S. PATENT DOCUMENTS

| | | | |
|---|---|---|---|
| 3,111,223 | 11/1963 | Jacobi | 229/40 X |
| 3,750,871 | 8/1973 | Cook | 206/65 R X |
| 3,834,609 | 9/1974 | Congleton | 206/509 X |
| 3,905,474 | 9/1975 | Haibara | 206/461 X |
| 4,494,897 | 1/1985 | Rogers | 410/154 |
| 4,497,432 | 2/1985 | Milia | 229/20 X |
| 4,560,069 | 12/1985 | Simon | 206/591 |
| 4,601,390 | 7/1986 | Rosenthal et al. | 229/120.15 X |
| 5,000,376 | 3/1991 | Wojdyla | 410/154 X |
| 5,102,272 | 4/1992 | Woods et al. | 410/154 |
| 5,299,734 | 4/1994 | Lane | 229/120.15 X |
| 5,306,100 | 4/1994 | Higginbotham | 206/593 X |

Primary Examiner—Frank E. Werner
Assistant Examiner—James Eller
Attorney, Agent, or Firm—Schwartz & Weinrieb

[57] ABSTRACT

A collapsible and expandable void filler for separating cargo during transit in trucks, railroad cars, airplanes and the like includes an outer tubular housing having a diamond-shaped tubular core. The housing and core are collapsible into a generally flat configuration along score indentations. In one embodiment, the void filler is held in an expanded configuration by a plurality of collapsible wall portions along the outer housing that collapse inwardly from the periphery of the housing and engage the core. In other embodiments, the void filler is held in an expanded configuration by a cord or elastomeric bands which are tightly stretched around the periphery of the housing and is held in a series of aligned notches.

20 Claims, 2 Drawing Sheets

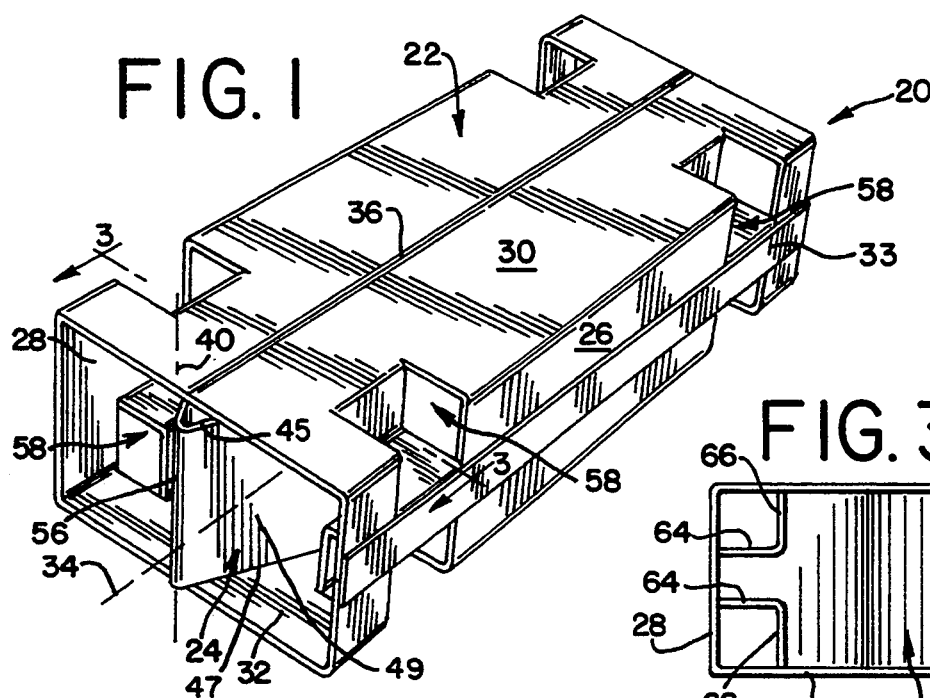
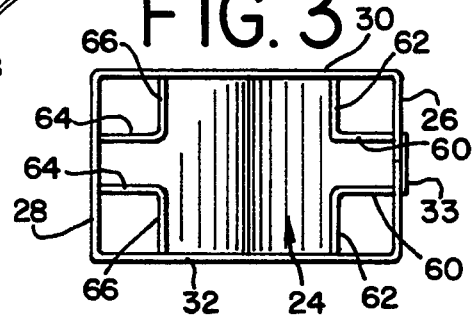
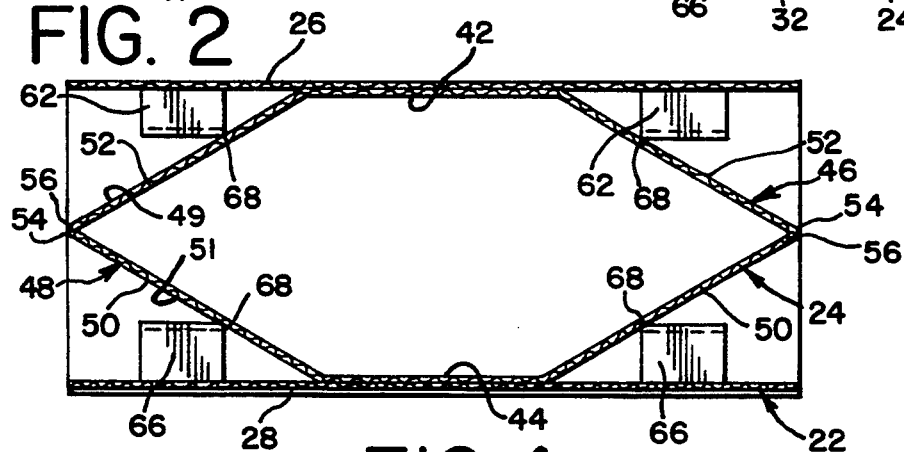
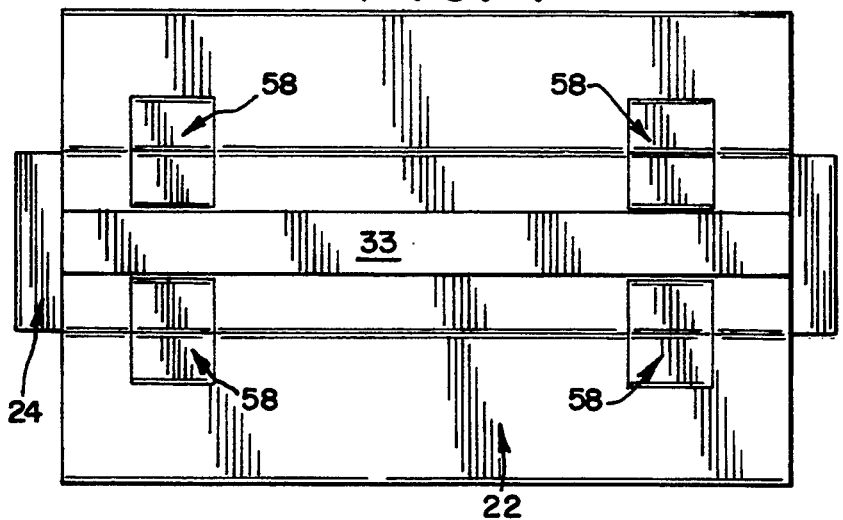

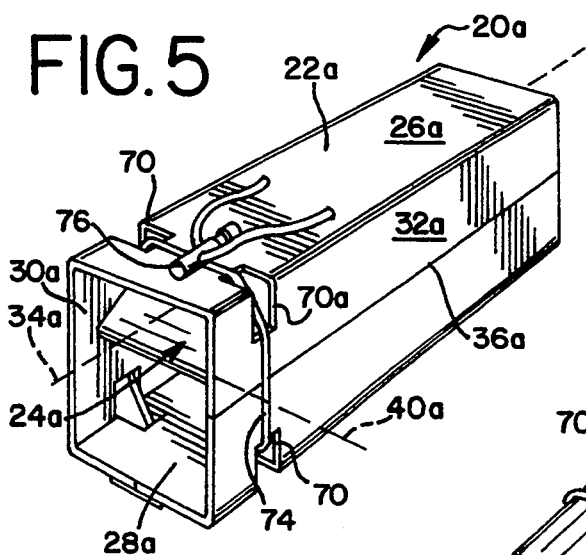
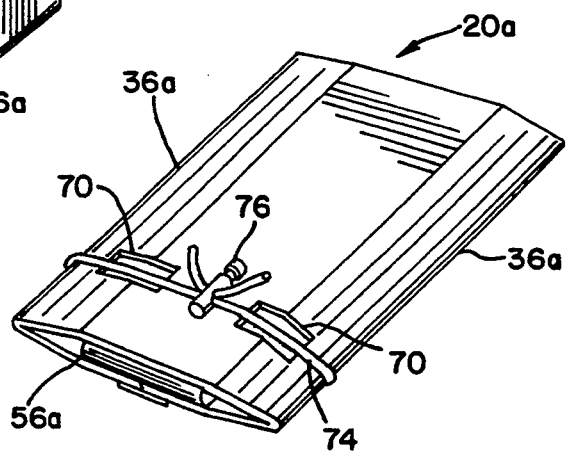
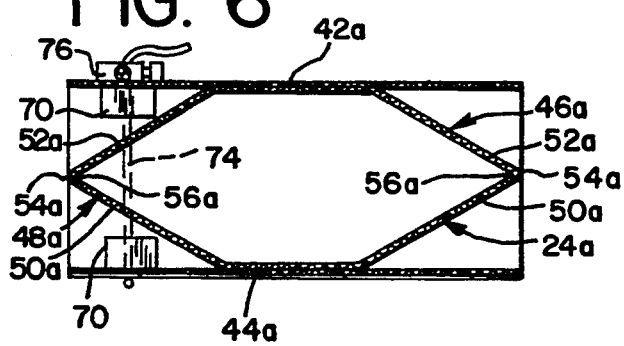
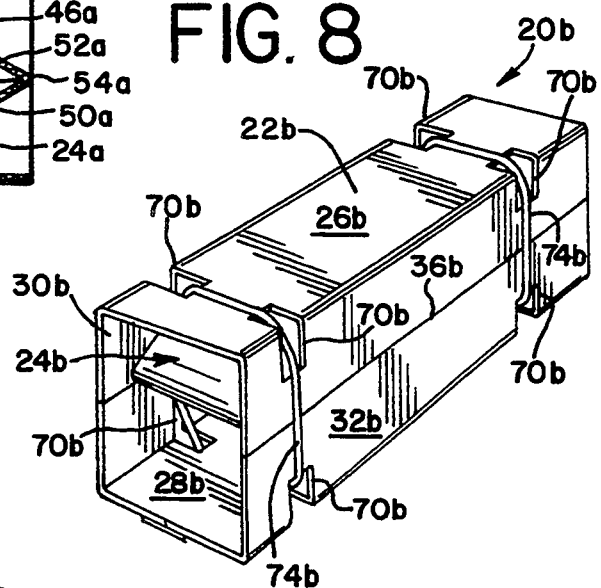
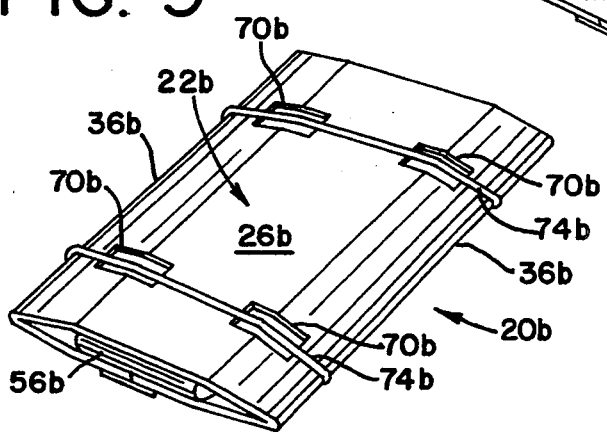

COLLAPSIBLE AND EXPANDABLE VOID FILLER

FIELD OF THE INVENTION

This invention is generally directed to a void filler which is used to fill empty spaces in a cargo area of a truck, railroad car, airplane and the like so as to prevent damage to cargo that may be caused by the cargo shifting during transit. More specifically, this disclosure shows a void filler which may be expanded into a rigid configuration for use in filling spaces and collapsed into a generally flat configuration for storage.

BACKGROUND OF THE INVENTION

Prior art void fillers, such as disclosed in U.S. Pat. No. 4,494,897 to Rogers and B1 4,494,897 to Rogers, utilize a void filler which may be expanded for use in filling spaces and collapsed into a generally flat configuration for storage. The void filler disclosed in U.S. Pat. No. 4,494,897 to Rogers and B1 4,494,897 to Rogers includes an outer tubular housing and an inner diamond-shaped core. The housing and the core readily collapse about integrally formed score indentations. To use the void filler, the outer housing is compressed about the score indentations thereby expanding the housing walls and the core. The void filler is placed between pieces of cargo and prevents the cargo from damaging each other due to shifting during transit.

While this type of void filler effectively prevents damage to cargo, the void filler cannot maintain an expanded configuration without cargo being placed along its sides since it readily collapses about the score indentations. Thus, a single operator cannot easily place the void filler between pieces of cargo since it does not maintain an expanded configuration and readily collapses.

The present invention is intended to overcome or minimize all of these problems, as well as to present several other improvements.

OBJECTS OF THE INVENTION

A general object of the present invention is to provide a rigid void filler which is placed between pieces of cargo or between cargo and a wall to prevent damage to the cargo during transit in a truck, railroad car, airplane and the like.

Another object of the present invention is to provide a void filler which is easily expanded into a rigid configuration and easily collapsed into a generally flat, collapsed configuration for storage.

It is a further object of the present invention to provide a core which provides resistance to crushing and distortion by a load.

It is a specific object of the present invention to provide a void filler which is lightweight.

SUMMARY OF THE INVENTION

Briefly, and in accordance with the foregoing, the present invention discloses a collapsible void filler device which is foldable into a flat, collapsed configuration for storage and unfoldable into an expanded configuration for preventing damage to cargo during transit in a truck, railroad car, airplane and the like. The void filler is a generally tubular member that includes an outer housing having a bottom wall, a top wall, and two side walls. The side walls of the tubular member extend upwardly from the bottom wall to the top wall when the void filler is disposed in an expanded configuration. The side walls include integrally formed score indentations that urge the side walls outwardly so that the tubular member collapses.

An inner core member is disposed within the tubular member and has a bottom wall connected to the bottom wall of the tubular member and a top wall connected to the top wall of the tubular member. Side walls interconnect the bottom wall and the top wall. The inner core member has a width which extends across a majority of the length of the tubular member, and a length which is sized so as to contact and space apart the tubular member side walls so as to prevent inward movement of the tubular member side walls. The inner core member also rigidifies the tubular member when the void filler is disposed in an expanded configuration. The side walls include integrally formed score indentations which urge the side walls to fold and collapse when the tubular member is collapsed.

The tubular member includes means thereon which counteract the score indentations that urge the void filler into a collapsed configuration. In a first embodiment, this counteracting means includes collapsible wall portions which frictionally engage the inner core member so that the void filler remains in an expanded configuration. In a second embodiment, the counteracting means includes integrally formed notches in the walls of the tubular member and an encircling member, such as a cord or an elastomeric band, which is held in the notches and surrounds the perimeter of the void filler.

BRIEF DESCRIPTION OF THE DRAWINGS

The organization and manner of the structure and operation of the invention, together with further objects and advantages thereof, may best be understood by reference to the following description, taken in connection with the accompanying drawings in which like reference characters designate like or corresponding parts throughout the several views, and wherein:

FIG. 1 is a perspective view of a void filler incorporating the present invention according to a first embodiment;

FIG. 2 is a cross-sectional view of the void filler in FIG. 1;

FIG. 3 is a cross-sectional view of the void filler of FIG. 1 as taken along line 3—3;

FIG. 4 is a top plan view of the void filler of FIG. 1 in a collapsed configuration;

FIG. 5 is a perspective view of a void filler incorporating the present invention according to a second embodiment;

FIG. 6 is cross-sectional view of the void filler in FIG. 5;

FIG. 7 is a perspective view of the void filler of FIG. 5 in a collapsed position;

FIG. 8 is a perspective view of a void filler incorporating the present invention according to a third embodiment; and FIG. 9 is a perspective view of the void filler of FIG. 8 in a collapsed position.

DETAILED DESCRIPTION OF THE PREFERRED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

As shown in the drawings a void filler 20, which incorporates the present invention, is illustrated. A first and preferred embodiment is shown in FIGS. 1–4. The embodiment shown in FIGS. 5–7 illustrates a modification of the preferred embodiment as a second embodiment, and the embodiment shown in FIGS. 8–9 illustrates another modification of the preferred embodiment as a third embodiment.

The following general description of the void filler is described in reference to the preferred embodiment shown in FIGS. 1–4. It is to be understood that similar elements are shown in FIGS. 5–9 and the general description of the void filler as described below applies to those embodiments. Similar elements or features are designated by similar reference numerals as described herein with the exception that the embodiment of FIGS. 5–7 includes an "a" and the embodiment of FIGS. 8 and 9 includes a "b".

The void filler 20 includes a generally tubular outer housing member 22 and a tubular inner core 24 which provides a tube within a tube construction. The void filler 20 is easily foldable into a generally flat, collapsed configuration, for example as shown in FIGS. 7 and 9. Since the void filler 20 can be collapsed into a generally flat configuration, the void filler 20 does not occupy a large volume of space while stored. In use, when the void filler 20 is unfolded into an expanded configuration, the void filler 20 is rigid and is placed between pieces of cargo (not shown) or between cargo and a wall (not shown) and prevents damage to the cargo during transit. Multiple void fillers may be stacked on top of each other and placed between loads. The void filler 20 may be provided in a variety of sizes depending on the application.

Preferably, the housing 22 is made from paperboard and the core 24 is made from corrugated cardboard. The corrugated cardboard provides the void filler 20 with rigidity and strength so the void filler 20 can support a load. Furthermore, since paperboard and corrugated cardboard are used in the void filler 20 construction, the void filler 20 is lightweight.

The generally tubular outer housing member 22 includes a top wall 26, a bottom wall 28 and two side walls 30, 32. The housing 22 may be constructed from a single sheet of material which is folded about fold lines to create the top 26, bottom 28 and side 30, 32 walls. The ends of the sheet are joined along a wall, shown as the top wall 26 in FIG. 1, by suitable means, such as adhesive, glue and the like. As shown, the ends of the sheet are joined by a piece of tape 33. It is to be understood that the ends of the single sheet may overlap. It is also to be understood that more than one sheet may be used to form the housing 22 with the sheets being attached to each other by suitable means, such as tape, adhesive, glue and the like.

The tubular outer housing member 22 has a longitudinal axis, designated 34, which extends the length of the void filler 20. The void filler 20 may be placed between the load to be supported with either its longitudinal or lateral axis intersecting the load.

The side walls 30, 32 of the housing 22 extend upwardly from the bottom wall 28 to the top wall 26 when the void filler 20 is expanded. Each side wall 30, 32 is divided at approximately its midpoint into an upper and a lower portion by a scoring bead or an integrally formed score indentation 36, which extends along the length of each side wall 30, 32. The score indentations 36 are applied by any well known method, such as an automatic roller or a manual device, and is intended not to pierce, cut or otherwise weaken the material but instead act to create a force which urges the side walls 30, 32 outwardly to collapse the housing 22 into a flattened configuration. The score indentations 36 allow the side walls 30, 32 to be easily folded outwardly by a user when it is necessary to collapse the void filler 20 for storage as described hereinbelow.

A central inner core member 24 is located in the interior or hollow portion provided by the tubular housing 22. The core 24 has a width which extends across a majority of the length of the housing 22 and has a longitudinal axis, designated 40, which, when the void filler 20 is expanded, is perpendicular to the longitudinal axis 34 of the housing 22. The core 24 provides resistance to crushing and distortion.

The core 24 is a tubular member which is preferably substantially diamond shaped when the void filler 20 is in an expanded configuration. The core 24 includes an upper attaching foot member or top wall 42 and a lower attaching foot member or bottom wall 44 connected to each other by side walls 46, 48. The upper foot member 42 is attached to the interior of the top wall 26 of the housing 22 and the lower foot member 44 is attached to the interior of the bottom wall 28 of the housing 22. The foot members 42, 44 may be attached to the housing 22 by a staple, brad or other mechanical connector, and preferably adhesive. The foot members 42, 44 securely hold the core 24 in position within the housing 22.

The side walls 46, 48 of the core 24 include diagonal leg members which extend from and connect each foot member 42, 44 in a zig-zag, angled fashion. Each side wall 46, 48 has longitudinally separated edges 45, 47 and interposed planar surfaces 49, 51, such structure defining an upwardly and outwardly extending leg member 50 and a downwardly and outwardly extending leg member 52 which converge and are joined at an apex 54.

A scoring bead or an integrally formed score indentation 56 is formed at each apex 54 which allows the core 24 to bend easily at each apex 54 as the void filler 20 is collapsed for storage. Each score indentation 56 may be formed as described hereinabove.

The side walls 46, 48 of the core 24 act as spacers and have a length which is sized to contact and space apart the housing side walls 30, 32 so as to prevent the housing side walls 30, 32 from collapsing inwardly when a load is placed against the void filler 20. The side walls 46, 48 of the core 24 further act to rigidify the housing 22 when the void filler 20 is in an expanded configuration.

The core 24 may be housed completely within the tubular housing 22 when the void filler 20 is in an expanded configuration as illustrated in FIGS. 2, 5 and 8. Alternatively, the core 24 may extend past the edges of the housing as shown in FIGS. 1 and 4. The diagonal leg members 50, 52 of the core 24 are not limited to the shown angles and may be constructed using a greater or lesser angle.

The core 24 may be constructed from a single sheet of material which is folded about fold lines to create the upper foot member 42, the lower foot member 44 and the leg members 50, 52. The ends of the sheet are joined along a foot member 42, 44 by suitable means, such as tape, adhesive, glue and the like. It is to be understood that the ends of the single sheet may overlap. It is also to be understood that more than one sheet may be used to form the core 24 with the sheets being attached to each other by suitable means, such as tape, adhesive, glue and the like.

When the void filler 20 is an expanded configuration, the top 26 and bottom 28 walls of the housing 22 are parallel with respect to each other. The side walls 30, 32 and top wall 26 of the housing 22 are at approximately a 90° angle relative to each other and the side walls 30, 32 and the bottom wall 28 of the housing 22 are at approximately a 90° angle relative to each other.

Now the specifics of the first and preferred embodiment, as shown in FIGS. 1-4, will be described. The housing 22 includes collapsible wall portions 58 which collapse inwardly of the perimeter of the housing 22 and frictionally engage the diagonal leg members 50, 52 of the core 24 as described in detail hereinbelow. The friction between the collapsible wall portions 58 and the core 24 causes the void filler to remain expanded by acting to counteract the outwardly urging force created by the score indentations 36 in the side walls 30, 32 of the housing 22.

As shown in FIGS. 1-4, eight collapsible wall portions 58 are illustrated although it is to be understood that a greater or fewer number of collapsible wall portions may be used. The number of collapsible wall portions necessary for use is dependent on the size of the void filler. As illustrated, the collapsible wall portions 58 include four upper wall portions and four lower wall portions. The wall portions 58 may be cut out of the walls 26, 28, 30 and 32 of the housing 22 by conventional techniques such as cutting.

Each upper wall portion includes a section 60 of the top wall 26 and a section 62 of a side wall 30, 32. Each lower wall portion includes a section 64 of the bottom wall 28 and a section 66 of a side wall 30, 32. Each of the respective sections are aligned with each other and continuous. For example, section 60 is aligned and continuous with section 62. When the wall portions 58 collapse inwardly, the sections are at approximately a 90° angle relative to each other.

Each section 60 of the top wall 26 collapses inwardly to form a vertical wall of each upper wall portion and each section 62 of each side wall 30, 32 collapses inwardly to form a horizontal wall of each upper wall portion. Similarly, each section 64 of the bottom wall 28 collapses inwardly to form a vertical wall of each lower wall portion and each section 66 of each side wall 30, 32 collapses inwardly to form a horizontal wall of each lower wall portion.

Each vertical wall is of a sufficient length such that the horizontal wall engages the diagonal leg member 50, 52 of the core 24. An edge 68 of each of the horizontal walls frictionally engages each planar surface 49, 51 of the diagonal leg members 50, 52 which causes the void filler 20 to remain in an expanded configuration. The horizontal walls are of a sufficient length such that a majority of the length of the core 24 is engaged. The interaction between the edges 68 of the horizontal walls and the leg members 50, 52 creates a frictional force which is greater than the outwardly urging force created by the score indentations 36 of the housing 22. Thus, when the wall portions 58 are collapsed, the void filler 20 remains in an expanded condition due to the frictional force.

To expand the void filler 20, a user need only apply light hand pressure to the side walls 30, 32 of the housing 22 of the void filler 20. When the side walls 30, 32 contact the core 24, the user collapses the wall portions 58 inwardly.

To collapse the void filler 20, a user need only apply pressure to the top wall 26 of the housing 22. The pressure exerted by the user overcomes the frictional force created by the interaction of the edges 68 of the collapsible wall portions 58 and the diagonal leg members 50, 52. Thereafter, the void filler 20 collapses along the score indentations 36 and 56. The collapsible wall portions 58 will flatten as the void filler 20 collapses into a generally flat configuration.

Now the specifics of the second embodiment, as shown in FIGS. 5-7 which incorporates the present invention, will be described. The housing 22a includes generally V-shaped notches 70 at one end thereof. A member 74, such as a cord or an elastomeric band, encircles the perimeter of the housing 22a and is located in the notches 70 when the void filler 20a is expanded. It is to be understood that the cord 74 may be provided along any point along the length of the void filler 20a, however, the preferred location is at a position that is displaced from the core 24a. If the cord 74 is placed along the length of the core 24a, the core 24a is provided with slots since the member 74 will intersect or engage the core 24a.

The notches 70 are formed by slots in the walls along the corners of the housing 22a. The slots extend perpendicularly to the longitudinal axis 34a of the housing 22a and are aligned with each other along the perimeter of the housing 22a. The slots may be formed by conventional techniques such as cutting.

As shown in FIGS. 5-7, four V-shaped notches 70 are illustrated although it is to be understood that a greater number of sets of notches may be used. As illustrated, two upper notches and two lower notches are shown. Each upper notch is created by pairs of slots with one slot in the top wall 26a of the housing 22a and one slot in a side wall 30a, 32a of the housing 22a. The respective slots are aligned with each other to form the generally V-shaped notches 70.

Likewise, each lower notch is created by pairs of slots with one slot in the bottom wall 28a of the housing 22a and one slot in a side wall 30a, 32a. The respective slots are aligned with each other to form the generally V-shaped notches 70.

To hold the void filler 20a in a rigid, expanded position, the cord 74 encircles the perimeter of the housing 22a and is held in notches 70 when the void filler 20a is expanded and thereby counteracts the outwardly pushing force created by the scored indentation lines 36a of the housing 22a. The cord 74 includes a cord lock 76, such as one that is disclosed in U.S. Pat. No. 4,453,292 to Bakker which disclosure is incorporated herein by reference. Excess cord is left sticking out of the cord lock 76. The cord 74 is stretched tightly around the perimeter of the void filler 20a to hold the void filler 20a in an expanded configuration. The stretched cord 74 prevents the void filler 20a from collapsing since the side walls 30a, 32a of the housing 22a are unable to fold outwardly under the urging of the score indentations 36a.

To expand the void filler 20a, a user grasps the ends of the cord that is sticking out of the cord lock 76 and pulls the ends in opposite directions away from the cord lock 76. This allows the cord 74 under tension to slide into the four corner notches 70 driving the side walls 30a, 32a of the housing 22a inwardly and upwardly thereby expanding the housing 22a and the core 24a into an expanded configuration as shown in FIG. 5.

To collapse the void filler 20a, the cord 74 is loosened from around the periphery of the void filler 20a by releasing the cord lock 76. Thereafter, the user need only apply pressure to the top wall 26a of the void filler 20a which drives the cord 74 out of the corner notches 70, and the void filler 20a collapses around the score indentations 36a and 56a as shown in FIG. 7.

Now the specifics of the void filler 20b shown in FIGS. 8 and 9, which incorporates the third embodiment of the present invention, will be disclosed. The void filler 20b is substantially similar to the void filler 20a of FIGS. 5-7. As illustrated in this embodiment, the housing 22b is provided with a set of V-shaped notches 70b at positions near each end of the void filler 20b. The V-shaped notches 70b in the housing 22b of this embodiment are identical to the notches 70 in the housing 22a of the embodiment of FIGS. 5-7 as described hereinabove.

In the embodiment shown in FIGS. 8 and 9, the member 74b is an elastomeric band, however, a cord of the type described hereinabove may be used. While two bands are illustrated, it is to be understood that more than two bands may be provided. The amount of bands necessary depend on the size of the void filler 20b. It is also to be understood that the bands 74b may be provided along any point along the length of the void filler 20b.

Each band 74b is stretched tightly around the perimeter of the housing 22b and is housed within the notches 70b when the void filler 20b is expanded. The bands 74b, in an identical function of the cord 74 of FIGS. 5-7, act to counteract the outwardly urging force created by the score indentations 36b in the side walls 30b, 32b of the housing 22b.

To expand the void filler 20b, a user need only to apply a light hand pressure to the side walls 30b, 32b of the housing 22b. This pressure allows the elastomeric bands 74b to slide into the corner notches 70b thereby driving the side walls 30b, 32b of the housing 22b inwardly and upwardly to expand the housing 22b and the core 24b as shown in FIG. 8.

To collapse the void filler 20b, a user need only exert pressure on the top wall 26b of the housing 22b. As the void filler 20b collapses along the score indentations 36b and 56b, the elastomeric bands 74b are driven out of the corner notches 70b and the void filler 20b collapses into a generally flattened configuration as shown in FIG. 9.

The void fillers 20, 20a, 20b, which incorporate the present invention, may be easily assembled in the field by personnel having no specialized training. The operation of the void fillers 20, 20a, 20b is self-explanatory. Also, because of the compact configuration, the collapsed void fillers 20, 20a, 20b may be easily transported when not in use or easily transported to a shipper. Furthermore, the void fillers 20, 20a, 20b are reusable.

While embodiments of the present invention are shown and described, it is envisioned that those skilled in the art may devise various modifications of the present invention without departing from the spirit and scope of the appended claims. The invention is not intended to be limited by the foregoing disclosure.

The invention claimed is:

1. A collapsible void filler device foldable into a flat, collapsed configuration for storage, and unfoldable into an expanded configuration for preventing damage to cargo during transit, comprising:

an outer housing comprising a four-sided, generally tubular member having a bottom wall, a top wall, and two side walls, and a longitudinal axis extending the length thereof;

said side walls of said outer housing tubular member extending upwardly from said bottom wall of said outer housing tubular member to said top wall of said outer housing tubular member when said void filler is disposed in said expanded configuration and including means for permitting said side walls of said outer housing tubular member to move outwardly so as to collapse said outer housing tubular member into said collapsed configuration;

an inner core member disposed within said outer housing tubular member and having a bottom wall connected to said bottom wall of said outer housing tubular member; a top wall connected to said top wall of said outer housing tubular member; and side walls, having longitudinally spaced edges and planar surfaces extending therebetween, interconnecting said bottom wall and said top wall of said inner core member; and having further a width which extends across a majority of the length of said outer housing member, and a length which is sized so as to contact and space apart said side walls of said outer housing tubular member so as to prevent inward movement of said side walls of said outer housing tubular member and thereby rigidify said outer housing tubular member when said void filler is disposed in said expanded configuration;

said side walls of said inner core member having means for permitting said side walls of said inner core member to be folded and collapsed when said outer housing tubular member is collapsed; and said outer tubular housing member including means thereon for engaging said planar surfaces of said side walls of said inner core member so as to prevent said side walls of said inner core member from collapsing so as to in turn prevent said void filler from collapsing into said collapsed configuration so that said void filler remains in said expanded configuration.

2. A collapsible void filler as defined in claim 1, wherein said engaging means includes portions of said outer housing tubular member being collapsible inwardly of the perimeter of said outer housing tubular member to engage said side walls of said inner core member to cause said void filler to remain in said expanded configuration.

3. A collapsible void filler as defined in claim 2, wherein said portions of said outer housing tubular member includes portions of said top wall and side walls of said outer housing tubular member defining upper wall portions, and portions of said bottom wall and side walls of said outer housing tubular member defining bottom wall portions, each one of said upper wall portions and said bottom wall portions being collapsible inwardly of the perimeter of said outer housing tubular member so as to engage said side walls of said inner core member to cause said void filler to remain in said expanded configuration.

4. A collapsible void filler as defined in claim 3, wherein each one of said upper wall portions is comprised of a section of said top wall and a section of a side wall of said outer housing tubular member, said sections being aligned and continuous, each one of said sections of said top wall of said outer housing tubular member collapsing inwardly to form a vertical wall of each one of said upper wall portions and each one of said sections of said side walls of said outer housing tubular member collapsing inwardly to form a horizontal wall of each one of said upper wall portions;

each one of said lower wall portions is comprised of a section of said bottom wall and a section of a side wall of said outer housing tubular member, said sections being aligned and continuous, each one of said sections of said bottom wall of said outer housing tubular member collapsing inwardly to form a vertical wall of each one of said lower wall portions and each one of said sections of said side walls of said outer housing tubular member collapsing inwardly to form a horizontal wall of each one of said lower wall portions;

each one of said horizontal walls engaging said side walls of said inner core member to cause said void filler to remain in said expanded configuration.

5. A collapsible void filler as defined in claim 1, wherein said inner core member comprises a tubular core having a longitudinal axis which extends perpendicular to said longitudinal axis of said outer housing tubular member.

6. A collapsible void filler as defined in claim 1, wherein said means permitting said sides of said inner core member to be folded and collapsed when said outer housing tubular member is collapsed comprises integrally formed score indentations.

7. A collapsible void filler as defined in claim 1, wherein said means permitting said sides of said outer housing tubular member to move outwardly so as to collapse said outer housing tubular member comprises integrally formed score indentations.

8. A collapsible void filler as defined in claim 1, wherein said side walls of said inner core member interconnecting said bottom wall and said top wall of said inner core member comprise:

diagonal members extending in a zig-zag, angled fashion between said top wall and bottom wall of said inner core member and comprising two leg members extending from said top wall of said inner core member in a downwardly and outwardly direction to an apex where said two leg members join two other leg members extending in a downwardly and inwardly direction toward said bottom wall of said inner core member.

9. A collapsible void filler as defined in claim 8, wherein said engaging means includes portions of said outer housing tubular member being collapsible inwardly of the perimeter of said outer housing tubular member to engage said leg members of said inner core member to cause said void filler to remain in said expanded configuration.

10. A collapsible void filler as defined in claim 1, wherein said inner core member has a substantially diamond shaped configuration when said inner core member and said void filler are disposed in said expanded configuration.

11. A collapsible void filler as defined in claim 10, wherein said substantially diamond shaped configuration comprises foot members, comprising said bottom wall and said top wall of said inner core member, attached to said bottom wall and top wall of said outer housing tubular member to securely hold said inner core member in position within said outer housing tubular member; and said side walls of said inner core member comprise diagonal members extending from each foot member, joined at an apex, and connecting said bottom wall and said top wall of said inner core member.

12. A collapsible void filler as defined in claim 11, wherein said engaging means includes portions of said outer housing tubular member being collapsible inwardly of the perimeter of said outer housing tubular member to engage said diagonal members of said inner core member to cause said void filler to remain in said expanded configuration.

13. A collapsible void filler device foldable into a flat, collapsed configuration for storage, and unfoldable into an expanded configuration for preventing damage to cargo during transit, comprising:

an outer housing comprising a four-sided, substantially tubular member having a bottom wall; a top wall; and two side walls extending vertically between said bottom and top walls when said void filler is disposed in said expanded configuration and thereby defining an expanded periphery for said outer housing tubular member, said side walls including means for permitting said side walls to move outwardly so as to collapse said outer housing tubular member into said collapsed configuration;

an inner core member disposed within said outer housing tubular member and having a bottom wall connected to said bottom wall of said outer housing tubular member; a top wall connected to said top wall of said outer housing tubular member; and side walls interconnecting said bottom and top walls of said inner core member, having a length which is sized to contact and space apart said side walls of said outer housing tubular member so as to prevent inward movement of said side walls of said outer housing tubular member and thereby rigidify said outer housing tubular member when said void filler is disposed in said expanded configuration, and having means for permitting said side walls of said inner core member to be folded and collapsed when said outer housing tubular member is collapsed; and means defined upon said outer housing tubular member which are collapsible inwardly of said expanded periphery of said outer housing tubular member for engaging said sidewalls of said inner core member so as to prevent said side walls of said inner core member from collapsing into said collapsed configuration so that said void filler remains in said expanded configuration.

14. A void filler as set forth in claim 13, wherein:

said inwardly collapsible means of said outer housing tubular member comprise portions of said top and side walls of said outer housing tubular member, and portions of said bottom and side walls of said outer housing tubular member, which are foldable inwardly of said expanded periphery of said outer housing tubular member so as to be disposed at 90° with respect to each other.

15. A void filler as set forth in claim 13, wherein:

said outer housing tubular member has a longitudinal axis; and said inner core member comprises a tubular core having a longitudinal axis which is disposed perpendicular to said longitudinal axis of said outer housing tubular member.

16. A void filler as set forth in claim 13, wherein:

said means of said side walls of said outer housing tubular member for permitting said side walls of said outer housing tubular member to move outwardly so as to collapse said outer housing tubular member into said collapsed configuration, and said means of said side walls of said inner core member for permitting said side walls of said inner core member to be folded and collapsed when said outer housing tubular member is collapsed, comprise score indentations defined upon said side walls of said outer housing tubular member and said side walls of said inner core member.

17. A collapsible void filler device foldable into a flat, collapsed configuration for storage, and unfoldable into an expanded configuration for preventing damage to cargo during transit, comprising:

an outer housing comprising a four-sided, substantially tubular member having a bottom wall; a top wall; and two side walls extending vertically between said bottom and top walls when said void filler is disposed in said expanded configuration and thereby defining an expanded periphery for said outer housing tubular member, said side walls including means for permitting said side walls to move outwardly so as to collapse said outer housing tubular member into said collapsed configuration;

an inner core member disposed within said outer housing tubular member and having a bottom wall connected to said bottom wall of said outer housing tubular member; a top wall connected to said top wall of said outer housing tubular member; and side walls interconnecting said bottom and top walls of said inner core member, having a length which is sized to contact and space apart said side walls of said outer housing tubular member so as to prevent inward movement of said side walls of said outer housing tubular member and thereby rigidify said outer housing tubular member when said void filler is disposed in said expanded configuration, and having means for permitting said side walls of said inner core member to be folded and collapsed when said outer housing tubular member is collapsed; and means defined upon said outer housing tubular member which are movable relative to said top, bottom, and side walls of said outer housing tubular member between a first, outward position at which said means are continuous with said expanded periphery of said outer housing tubular member, and a second inward position at which said means are disposed inwardly of said expanded periphery of said outer housing tubular member for engaging said sidewalls of said inner core member so as to prevent said side walls of said inner core member from collapsing into said collapsed configuration so that said void filler remains in said expanded configuration.

18. A void filler as set forth in claim 17, wherein:
said movable means of said outer housing tubular member comprise portions of said top and side walls of said outer housing tubular member, and portions of said bottom and side walls of said outer housing tubular member, which are foldable inwardly of said expanded periphery of said outer housing tubular member so as to be disposed at 90° with respect to each other.

19. A void filler as set forth in claim 17, wherein:
said outer housing tubular member has a longitudinal axis; and
said inner core member comprises a tubular core having a longitudinal axis which is disposed perpendicular to said longitudinal axis of said outer housing tubular member.

20. A void filler as set forth in claim 17, wherein:
said means of said side walls of said outer housing tubular member for permitting said side walls of said outer housing tubular member to move outwardly so as to collapse said outer housing tubular member into said collapsed configuration, and said means of said side walls of said inner core member for permitting said side walls of said inner core member to be folded and collapsed when said outer housing tubular member is collapsed, comprise score indentations defined upon said side walls of said outer housing tubular member and said side walls of said inner core member.

* * * * *